United States Patent Office 3,534,191
Patented Oct. 13, 1970

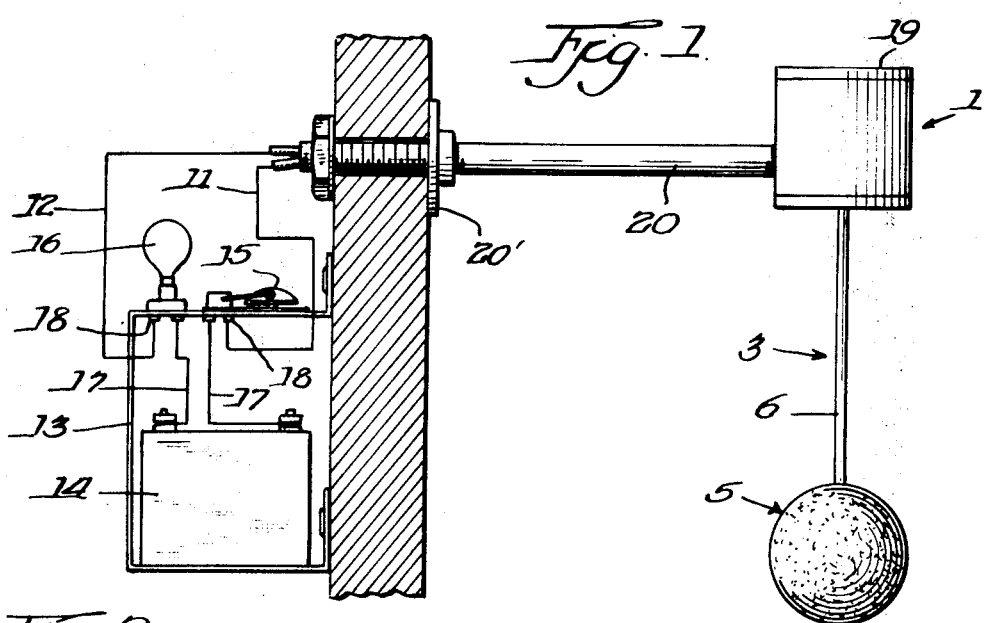
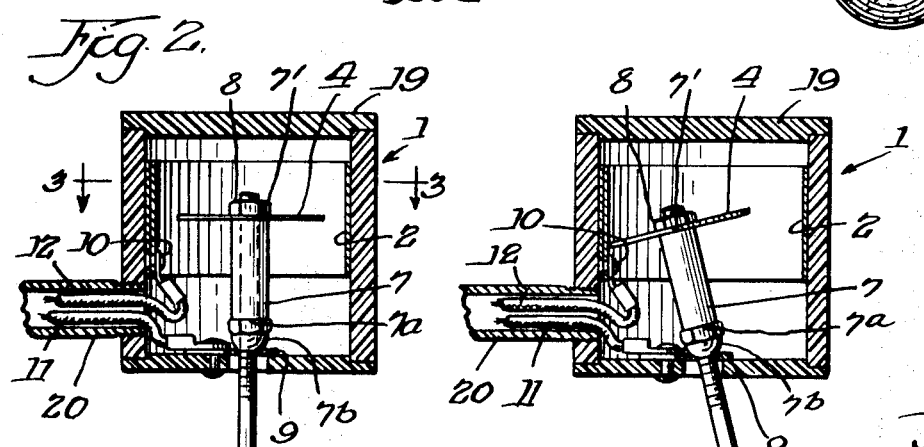
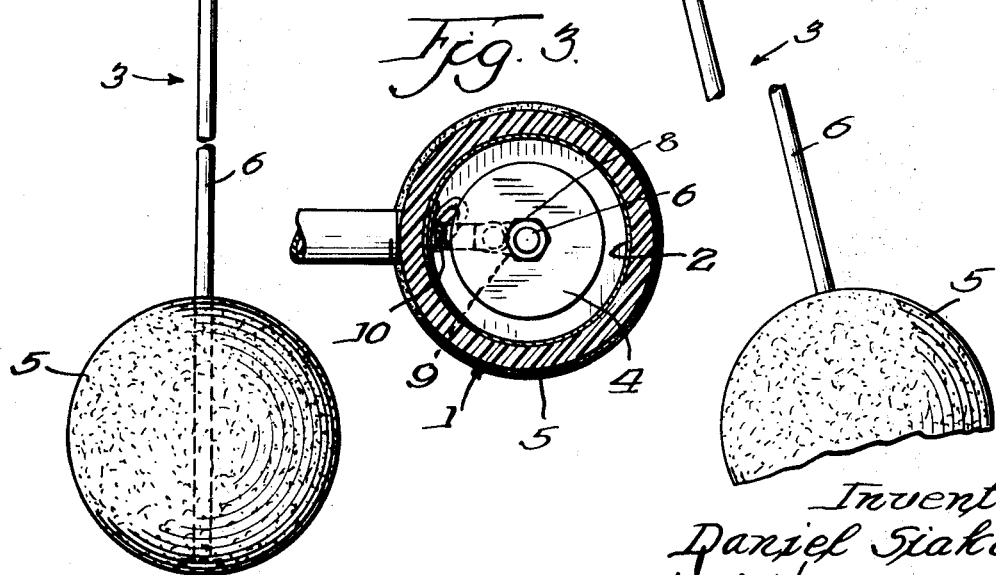
Inventor.
Daniel Siakel.

3,534,191
ELECTRICAL WIND VELOCITY INDICATOR AND ALARM
Daniel Siakel, 7 Kerry Lane, Wheeling, Ill. 60090
Filed June 27, 1969, Ser. No. 837,231
Int. Cl. H01h 35/24
U.S. Cl. 200—81.9
6 Claims

ABSTRACT OF THE DISCLOSURE

A wind pressure sensor device including a pendulum-like wind actuated member swingably supported from an exposed building wall, roof, tower, or pole attached, carrying an electrical circuit make and break member on the upper end of the pendulum arm cooperable with an electrical contact housed and fixedly mounted within said support, constructed in such a manner that it will, with a predetermined extent of swinging of the pendulum-like member under wind pressure and urge in any direction, be positively contacted by the circuit make and break element, closing an electrical circuit in which both are included and operatively energizing an audible and/or visual signal, or both, within hearing and sight range of a user.

---

This invention relates to improvements in a wind velocity indicator and alarm (audible, visual, or both), particularly to a simple and dependable relatively uncostly device of the stated character for predetecting and timely warning of the oncoming or approach of a meterological phenomena, id est, cyclones, hurricanes, tornados, and similar destructive atmospheric wind accompanied disturbances, hence, allowing the user time in which to effect security measures and precaution.

FIELD AND BACKGROUND OF THE INVENTION

Prefatorily stated, it is known that developments have been effected and patents granted which include instrumentalities operable as and when wind having a velocity above a predetermined degree occurs, to measure and visually indicate the same and the intensity thereof, as for example, different forms of anemometers. However, insofar as I am aware, such apparatuses and and devices are of complex and costly construction, thus, rendering them undesirable and unsatisfactory for general or lay use, especially, where simplicity of construction, usage and ruggedness, plus low cost, are required.

FIELD AND SUMMARY OF THE INVENTION (OBJECTS)

With the foregoing in mind, it is an object of the invention to provide a wind pressure sensor and alarm device of simple, rugged and uncostly construction capable of ready exterior installation on various characters of support structures from where it will be effectively and operatively exposed to the pressures of winds of activating velocities, particularly, those of predetermined degrees capable of causing physical property damage, this is in order that the user will be timely prewarned for the taking of appropriate security action and precaution.

An equally important object of the invention resides in providing to the alarm device an effective and novel form of electrical circuit closer so constructed as to be and remain operative regardless of the time, character or extent of its use and subjection to the elements—normal or abnormal.

A further object of the invention is to provide an electrical alarm circuit closer of construction and component arrangement that when installed upon the pressure or wind sensor device and the responsive pendulum-like member arm within the device housing and mounting will be assured of positive operation regardless of the direction of swinging movement of said member under urge or force of currently existing wind currents.

Other objects of the invention will be in part obvious and in part hereinafter pointed out.

BRIEF DESCRIPTION OF THE DRAWINGS

FIG. 1 is a schematic view illustrating one form of the wind velocity indicator and alarm in side elevation, mounted on a building or other wall, and the electrical wiring diagram therefor.

FIG. 2 is an enlarged vertical section through the device, with a portion of the rod broken away, in its neutral or inoperable position.

FIG. 3 is a horizontal section taken on the line 3—3 of FIG. 2, looking in the direction in which the arrows point, and FIG. 4 is a fragmentary vertical section through the housing showing the fragmentarily illustrated rod in an activated position, i.e. the contact disk edgewise contacting the circular contact band within said housing.

DESCRIPTION OF THE PREFERRED EMBODIMENT

Referring in detail to the drawings, the invention, generally described, comprises a cup-like housing 1 of substantially cross-sectionally circular shape and appropriate depth made of suitable moisture resistant material, dielectric material such as plastic, etc. in which a like shaped electrical contact band 2 preferably made of copper, in closed loop form, is snugly and fixedly mounted on and fully about its side walls; a pendulum-like member 3, the rod of which is swingably entered at its upper end through the bottom and into the housing and fixedly carries an electrically conductive disk 4 on its upper end within said housing, and a wind influenced ball 5 on its lower end, all of which are hereinafter more fully described. The diameter of the disk, it will be noted, is less than the internal diameter of the band contact 2 and, at times, is edgewise contactable therewith.

To complete the wind sensor member, as above generally described, the swingable or pivotal mounting of the rod 6 of the pendulum-like member 3 within the housing 1 and on its bottom, the upper end portion thereof is enlarged or provided with a fixedly mounted sleeve, as indicated by the reference numeral 7, forming spaced upper and lower shoulders 7' and 7a. The lower shoulder seats a nut 7b whose lower side is rounded, for pivotal or fulcruming bearing on the housing bottom, specifically, on a ring contact, hereinafter described, seated thereon; hence, improving the aforesaid swingable mounting of the rod. The upper shoulder 7' seats the contact disk 4 locked or secured thereon by a nut 8 threaded on the adjacent rod end and bearing on the disk. Thus, the rod is swingable with the contact disk positioned in apposed relation to the contact band 2 for edgewise engagement therewith.

In order that the electrical alarm energizing or operating circuit may be completed (closed), as and when contact between the band 2 and disk 4 is made, a ring contact 9 is affixed to the housing bottom surrounding the opening therein through which the upper end portion of the rod 6 is entered, and has the rounded shoulder of the nut 7b seated thereon, while a second contact terminal 10 is connected to the contact band 2.

Electrical conductors 11 and 22 are, respectively, connected to the contact ring 9 and contact terminal 10.

Various forms of electrical energy supply may be provided to the device, appropriately connected, of course, to the conductors 11 and 12. One such source of supply may consist of a bracket shelf 13 on which an electric battery 14, of adequate voltage, is mounted. The upper or other suitable portion of the bracket shelf is formed to receive an audible alarm 15 (bell) or a visual alarm lamp 16, or both, included in the electrical alarm circuit by wiring 17 connected, in turn, to terminals 18 to which the conductors 11 and 12 are connected. If desired, and such may be essential, a cover 19 may be provided to the open upper end of the housing 2 to protect the active elements within the same.

In usage of my wind velocity indicator and alarm device, it is mounted in a position fully exposed to the exterior and wind, as hereinbefore described. The electrical energy supply and alarm, as shown in FIG. 1 is preferably conveniently located and mounted within a building— home or otherwise—and connected to the wind velocity indicator and sensor device. Should winds of predetermined velocity develop, id est, sufficient to be of destructive force, they will contact the ball 5 of the pendulum-like member 3 causing it to pivot or swing to a canted position and the contact disk 4 to be moved into positive edgewise engagement or contact with an adjacent portion of the circular contact band 2. Thereby, the electrical circuit (aforesaid) will be closed, energized and operate the audible and/or visual signals within the equipped building, prewarning the user or users in order that they may timely effect security or safety precautions.

Obviously, with subsiding of the wind to normal pressure or velocity, the ball 5 with the pendulum-like member will return to normal substantially vertical position, thereby breaking electrical contact between the contact band 2 and disk 4, opening the alarm circuit.

It is of importance to here note that irrespective of the direction of the wind and the direction in which the member 3 and contact disk 4 are thereby moved, positive edgewise engagement of said disk with the annular contact band 2 and closing of the electrical circuit will be effected, hence, assuring dependable operation of the device signals, or alarms.

Various types of means for conducting or mounting the device of the invention on various kinds of supports, may, of course, be effected. One such is that of a horizontal tube 20 of appropriate length and endwise connected to and extended from the side wall of the housing 1; an attaching bracket plate 20' being carried on its outer end to facilitate the mounting. The electrical conductors 11 and 12 are threaded through and from the tube and connected to the terminals 18.

I claim:
1. A wind sensor and alarm device, comprising:
   (a) a housing,
   (b) a horizontally positioned circular electrical contact band mounted within the housing,
   (c) an electrical contact ring defining an electrical terminal on the housing bottom spaced from said band,
   (d) a normally substantially vertically disposed rod entered into the housing pivotally seated on the ring and extended downwardly from and beyond the housing bottom,
   (e) wind resistance means on the lower and extended end of the rod, and,
   (f) a horizontally positioned electrical contact disk on the upper end of the rod within said band in substantially edgewise apposed relation and engageable therewith upon pivotal movement of the rod in any direction.

2. The construction of claim 1 further characterized in that the electrical contact band is mounted within the housing on and extended about the side walls thereof and insulated therefrom, that the rod is entered into the housing through its bottom and pivotally seated on the contact ring, and the electrical contact disk on the upper end of the rod is arranged in substantially concentrically apposed relation to said contact band and edgewise engageable therewith upon pivotal movement of the rod in any direction.

3. The construction of claim 1 further characterized in that a bearing means is fixedly carried on the rod within the housing in spaced relation to the contact disk having universal pivotal bearing on and contact with the contact ring.

4. The construction of claim 1 further characterized in that the housing is of circular cross-sectional shape and is made of electrical insulative and moisture resistant material.

5. The construction of claim 1 further characterized in that the bearing means is fixedly carried on the rod within the housing in spaced relation to the contact disk, and has universal pivotal bearing on and contact with the ring.

6. The construction of claim 1 further characterized in that a universally pivotal bearing means is fixedly mounted on the rod within the housing below and spaced from the contact disk electrically connected thereto and having electrical bearing contact with the contact ring.

References Cited

UNITED STATES PATENTS

| 2,780,937 | 2/1957 | Haynes et al. | 73—189 |
| 2,913,546 | 11/1959 | Guinn | 340—241 |
| 3,180,950 | 4/1965 | Jacobsen | 200—61.41 |

ROBERT K. SCHAEFER, Primary Examiner

MORRIS GINSBURG, Assistant Examiner

U.S. Cl. X.R.

340—241